United States Patent
van Rensburg et al.

(10) Patent No.: US 8,000,654 B2
(45) Date of Patent: Aug. 16, 2011

(54) APPARATUS AND METHOD FOR CANCELING INTERFERENCE IN A SINGLE ANTENNA 1XEV-DV BASE STATION

(75) Inventors: Cornelius van Rensburg, Dallas, TX (US); Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 835 days.

(21) Appl. No.: 11/047,309

(22) Filed: Jan. 31, 2005

(65) Prior Publication Data

US 2006/0172703 A1 Aug. 3, 2006

(51) Int. Cl.
*H04B 1/00* (2006.01)
(52) U.S. Cl. .................................... 455/63.1
(58) Field of Classification Search ............... 455/63.1
See application file for complete search history.

(56) References Cited

U.S. PATENT DOCUMENTS

| | | | |
|---|---|---|---|
| 6,404,760 B1 * | 6/2002 | Holtzman et al. | 370/342 |
| 6,804,213 B2 * | 10/2004 | Zimmermann et al. | 370/332 |
| 2003/0012264 A1 * | 1/2003 | Papasakellariou et al. | 375/148 |
| 2004/0264557 A1 * | 12/2004 | Maruyama | 375/148 |

OTHER PUBLICATIONS

Sergio Verdu, Multiuser Detection, Cambridge University Press, 1998.*

* cited by examiner

*Primary Examiner* — Yuwen Pan (57) ABSTRACT

A wireless network base station capable of canceling interference caused by a dominant interferer signal from a mobile station. The base station comprises down-converts an RF to a down-converted signal, r(n). K complex PN demodulators multiply the down-converted complex r(n) signal by PN code sequences associated with each of the K mobile stations to produce K chip streams. K Walsh code demodulators multiply each of the K chip streams by a Walsh code associated with a mobile stations to produce K raw user signals. K subtractors subtract a first estimated interference signal associated with the dominant interferer signal from the K raw user signals to produce K estimated user signals. A detector receives the K estimated user signals and produces a detected user signal for each of the mobile stations. An interference estimator then determines which detected user signal is the dominant interferer signal.

20 Claims, 4 Drawing Sheets

APPARATUS AND METHOD FOR CANCELING INTERFERENCE IN A SINGLE ANTENNA 1XEV-DV BASE STATION

CROSS-REFERENCE TO RELATED APPLICATION(S)

The present invention is related to those disclosed in U.S. patent application Ser. No. 10/929,842, entitled "Apparatus and Method for Canceling Interference in a Single Antenna 1xev-Dv Base Station," filed on Aug. 30, 2004. Patent application Ser. No. 10/929,842 is assigned to the assignee of the present application. The subject matter disclosed in patent application Ser. No. 10/929,842 is hereby incorporated by reference into the present disclosure as if fully set forth herein.

TECHNICAL FIELD OF THE INVENTION

The present invention is directed generally to 1xEV-DV wireless networks and, more specifically, to an apparatus for canceling reverse link interference in a 1xEV-DV base station that uses a single antenna.

BACKGROUND OF THE INVENTION

Wireless communications systems, including cellular phones, paging devices, personal communication services (PCS) systems, and wireless data networks, have become ubiquitous in society. To attract new customers, wireless service providers continually seek to improve wireless services cheaper and better, such as by implementing new technologies that reduce infrastructure costs and operating costs, increase handset battery lifetime, and improve quality of service (e.g., signal reception).

CDMA technology is used in wireless computer networks, paging (or wireless messaging) systems, and cellular telephony. In a CDMA system, mobile stations (e.g., pagers, cell phones, laptop PCs with wireless modems) and base stations transmit and receive data in assigned channels that correspond to specific unique codes. For example, a mobile station may receive forward channel data signals from a base station that are convolutionally coded, formatted, interleaved, spread with a Walsh code and a long pseudo-noise (PN) sequence. In another example, a base station may receive reverse channel data signals from the mobile station that are convolutionally encoded, block interleaved, and spread prior to transmission by the mobile station. The data symbols following interleaving may be separated into an in-phase (I) data stream and a quadrature (Q) data stream for QPSK modulation of an RF carrier. One such implementation is found in the 1xEV-DV version of the IS-2000 standard.

In a 1xEV-DV wireless network, two types of interference limit the performance of the forward link (i.e., transmission link from base station to mobile station). When the mobile station is close to the base station, same cell interference due to multi-path reflections is the predominant type of interference. When the mobile station is at the outer edge of the cell site, neighboring cell interference is the predominant type of interference. Same cell interference is directly related to the transmit power of the base station. Since both 1xEV-DO and 1xEV-DV base stations continuously transmit at maximum power for packet data users, same cell interference is extreme in 1xEV-DO and 1xEV-DV wireless networks.

In U.S. patent application Ser. No. 10/929,842, incorporated by reference above, the Applicants disclosed a method and an apparatus for canceling forward channel (or forward link) interference in a 1xEV-DV or 1xEV-DO mobile station using a single antenna. However, it not only the forward channel that experiences interference from packet data users. Current simulations have shown that a cell site that maintains data calls will be able to maintain a maximum of only about 2 or 3 voice calls and 2 or 3 data calls at the same time. This is due to the high transmit power of the mobile stations that are engaged in a data call. Thus, the mobile stations cause high amounts of interference on the reverse link, just as the base station causes high amounts of interference on the forward link.

Indeed it has been shown that one mobile station transmitting data at 307 Kbps on the reverse link would generate as much interference as 16 voice-call mobile stations. This situation is expected to get worse in Release D of the 1xEV-DV standard, wherein a reverse packet data channel has been added which will transmit at even higher power and even higher data rates. This is expected to cause much higher interference to the other users.

Therefore, there is a need in the art for an improved base station that is capable of canceling interference on the reverse channel. In particular, there is a need for a single antenna base station that is capable of canceling reverse channel interference caused by mobile stations that are engaged in packet data calls.

SUMMARY OF THE INVENTION

The present invention introduces an apparatus and a related method for canceling reverse channel interference in a base station, thereby enabling the base station to receive signals having lower power. This results in increased capacity in each base station and in the wireless network. Advantageously, the present invention provides a relatively simple interference cancellation scheme in the base transceiver subsystem (BTS) of a base station that theoretically may achieve the kind of performance that is only possible using much more expensive antenna arrays or much more complicated successive interference cancellation schemes.

The simplicity of the present invention lies in the fact that the strongest interferers are from mobile stations in the same cell site, thus the base transceiver subsystem (BTS) already has all of the required information about the interferers. Also, since the BTS knows that the data calls are the strong interferers, the BTS does not need to use complicated estimation techniques to determine which interferers to cancel. Instead, the BTS automatically cancels signals from the data users. Furthermore, since typically there are only a few data calls active at any time, it is relatively simple to calculate the interference.

To address the above-discussed deficiencies of the prior art, it is a primary object of the present invention to provide, for use in a wireless network capable of communicating with K mobile stations, a base station capable of canceling interference caused by a dominant interferer signal from a first one of the K mobile stations. According to an advantageous embodiment of the present invention, the base station comprises: 1) a radio frequency (RF) down-converter for receiving an RF signal and outputting a down-converted signal, r(n); and 2) K pseudo-random noise (PN) demodulators capable of multiplying the down-converted r(n) signal by at least one PN code sequence associated with each of the K mobile stations, the K PN demodulators thereby producing K chip streams. The base station further comprises: 3) K Walsh code demodulators, each of the K Walsh code demodulators capable of multiplying one of the K chip streams by a Walsh code associated with one of the K mobile stations, the K Walsh code demodulators producing K raw user signals; and 4) K subtractors, each of the K subtractors capable of subtracting a first estimated interference signal associated with the dominant interferer signal from one of the K raw user signals, the K subtractors producing K estimated user signals. The base station also comprises 5) a detector capable of receiving the K estimated user signals and producing K detected user signals, one for each of the K mobile stations.

According to one embodiment of the present invention, the detector determines which of the K estimated user signals exceeds a first threshold value.

According to another embodiment of the present invention, the detector outputs a detected user signal equal to zero for each of the K mobile station for which no estimated user signal exceeds the first threshold value.

According to still another embodiment of the present invention, the base station further comprises an interference estimator capable of receiving the K detected user signals from the detector and comparing an interference signal in each of the K detected user signals to a second threshold value.

According to yet another embodiment of the present invention, the interference estimator outputs an estimated interference signal for each of the K detected user signals, the interference estimator thereby producing K estimated interference signals.

According to a further embodiment of the present invention, the interference estimator outputs an estimated interference signal equal to zero for each of the K detected user signals in which the interference signal does not exceed the second threshold value.

According to a still further embodiment of the present invention, the interference estimator determines which of the K estimated interference signals comprises the first estimated interference signal associated with the dominant interferer signal.

According to a yet further embodiment of the present invention, the interference estimator, in response to the determinations, applies the first estimated interference signal associated with the dominant interferer signal as an input to each of the K subtractors.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged base station.

Figure 1:
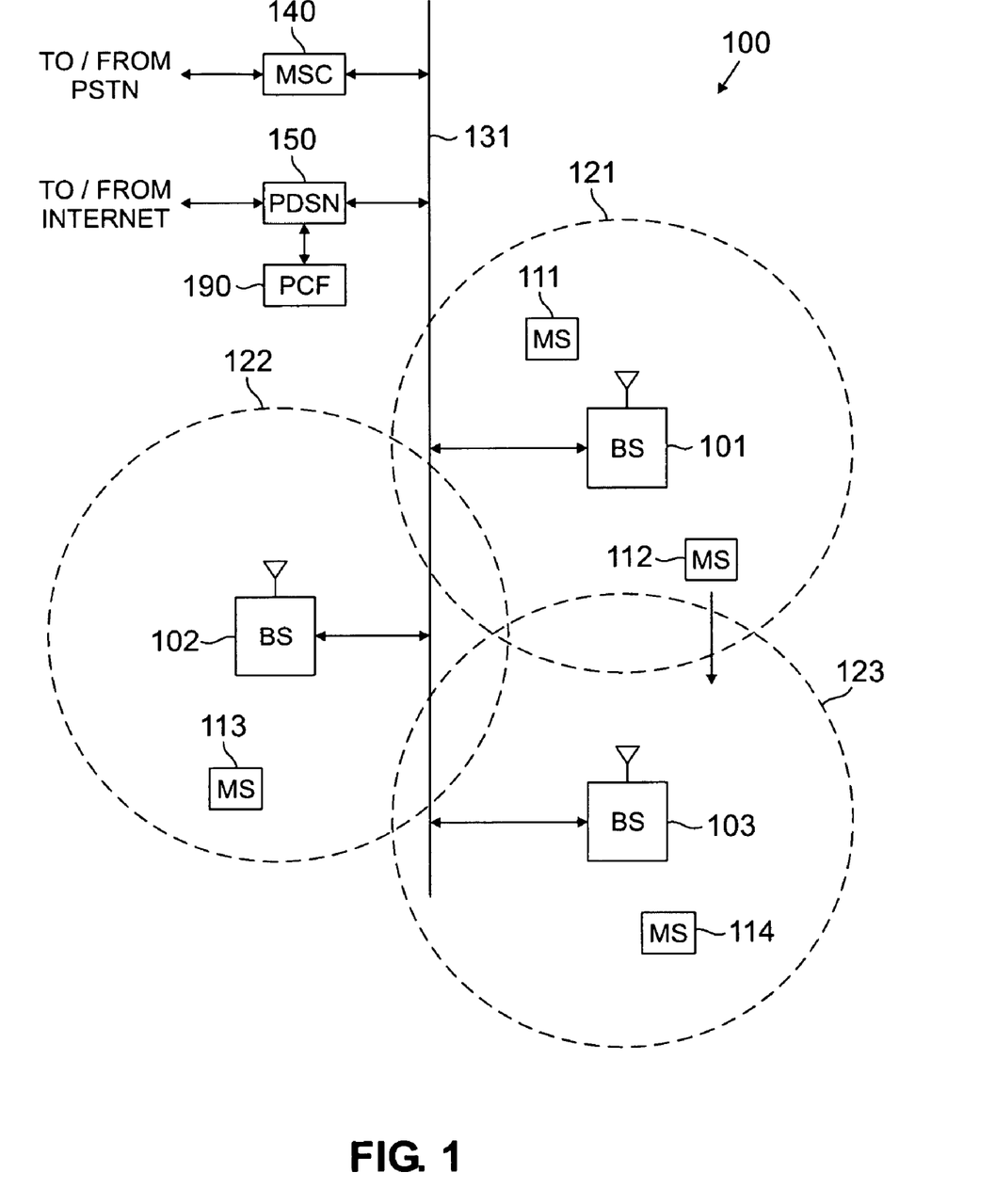
FIG. 1 illustrates an exemplary wireless network in which 1xEV-DV base stations cancel interference according to the principles of the present invention.

FIG. 1 illustrates exemplary wireless network 100, in which 1xEV-DV base stations cancel interference according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the 1xEV-DV standard. In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, however, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Figure 2:
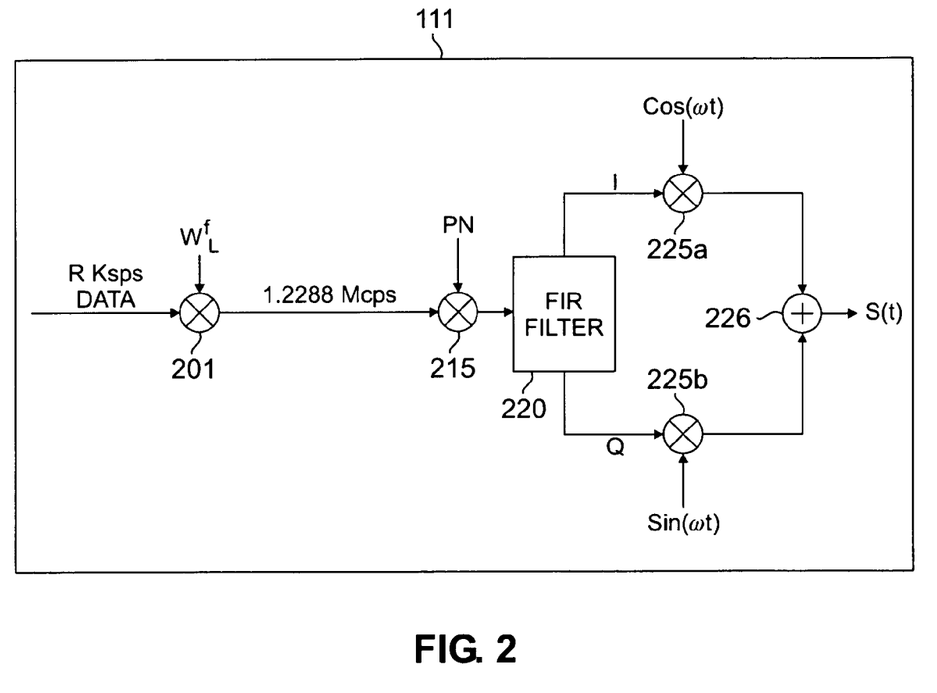
FIG. 2 illustrates selected portions of the transmit path in an exemplary mobile station according to an exemplary embodiment of the present invention.

FIG. 2 illustrates selected portions of the transmit path in exemplary mobile station 111 according to an exemplary embodiment of the present invention. Mobile station 111 comprises multiplier 201, multiplier 215, finite impulse response (FIR) filter 220, multipliers 225a and 225b, and adder 226. Multiplier 201 receives a stream of incoming data symbols at a data rate R and multiplies each of the data symbols by a known Walsh code of length L. In a 1xEV-DV system, this produces a chip stream having a chip rate of 1.2288 Mcps. It is noted that a mobile station may simultaneously transmit voice (on the fundamental channel), data (on the supplemental channel) and control and signaling information (on the control, reverse pilot and other reverse link channels) on parallel streams separated by different Walsh codes.

The incoming data streams may be for voice calls, data calls, or control signals. A voice signals is received at R=19.2 Ksps (kilosymbols per second) and is multiplied by a known Walsh code, $W^f$, having length L=64 chips. This produces a 1.2288 Mcps (megachip per second) output. A data signal is received at a variable rate, such as, for example, R=38.4 Ksps (kilosymbols per second) and is multiplied by a known Walsh code, $W^f$, having a variable length, such as, for example, a length L=32 chips. This also produces a 1.2288 Mcps (megachips per second) output. Finally, a control signal is received at a multiple of 9.6 Ksps (kilosymbols per second) and is multiplied by a known multiple of a 32-chip Walsh code sequence, depending on the specific channel. This also produces a 1.2288 Mcps output.

Multiplier 215 then multiplies the chip stream by a known pseudo-random noise (PN) code with a known long code mask associated with mobile station 111 as specified by the 1xEV-DV standard. The exemplary transmit path in FIG. 2 represents a complex data path of a quadrature phase shift keying (QPSK) radio-frequency (RF) transmitter. FIR filter 220 filters the output of multiplier 215 and outputs an in-phase (I) component signal and a quadrature (Q) component signal.

Mixer 225a performs up-conversion by multiplying the in-phase output of FIR filter 220 by the reference signal $\cos(\omega t)$. Mixer 225b performs carrier modulation by multiplying the quadrature output of FIR filter 220 by the reference signal $\sin(\omega t)$. The $\cos(\omega t)$ and $\sin(\omega t)$ reference signals are generated by a local oscillator (not shown). Adder 226 combines the outputs of mixer 225a and mixer 225b which are then up-converted, if necessary, to generate the RF output signal, S(t), which is then amplified and transmitted in a reverse channel to base station 101 in wireless network 100.

Figure 3:
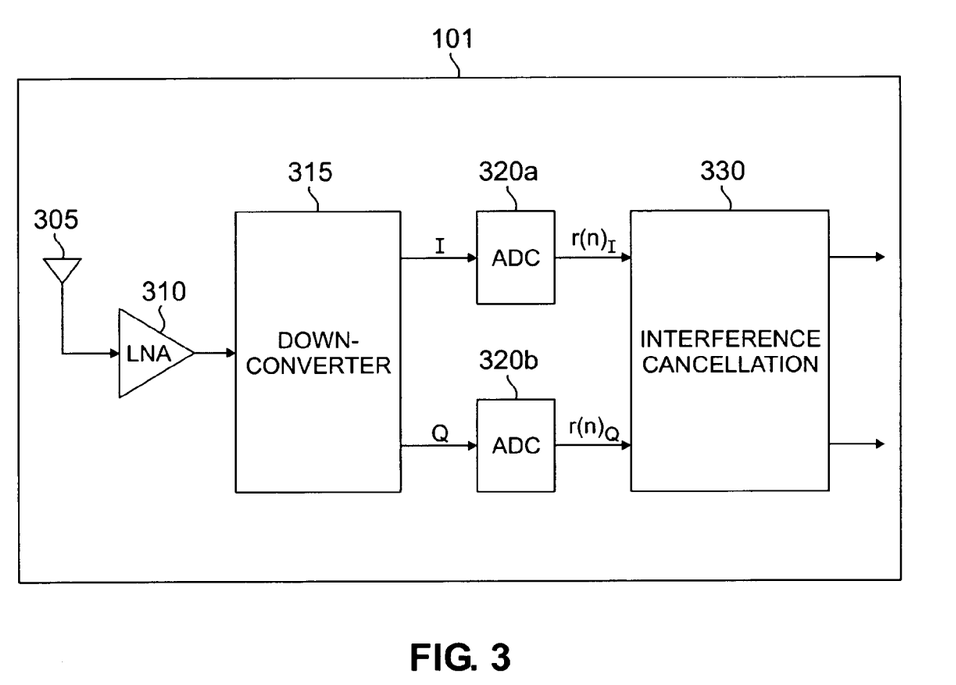
FIG. 3 illustrates selected portions of the receive path of an exemplary base station that cancels interference according to the principles of the present invention.

FIG. 3 illustrates selected portions of the receive path of exemplary base station 101, which cancels reverse channel interference according to the principles of the present invention. The receive path of base station 111 comprises antenna 305, low noise amplifier (LNA) 310, down-converter 315, analog-to-digital converter (ADC) 320a, analog-to-digital converter (ADC) 320b, and interference cancellation circuit 330.

Antenna 305 receives the RF signal, S(t), transmitted by mobile station 111. LNA 310 amplifies the incoming RF signal received by antenna 305 to a suitable level for processing. Down-converter 315 down-converts the amplified RF signal to an intermediate frequency (IF) signal or baseband signal. According to an advantageous embodiment of the present invention, down-converter 315 is a quadrature phase shift keying (QPSK) device that outputs an in-phase (I) signal and a quadrature (Q) signal. ADC 320a converts the in-phase signal from an analog signal to a sequence of digital samples, $r(n)_I$, and ADC 320b converts the quadrature signal from an analog signal to a sequence of digital samples, $r(n)_Q$. Interference cancellation circuit 330 cancels interference from the complex r(n) signal according to the principles of the present invention.

Figure 4:
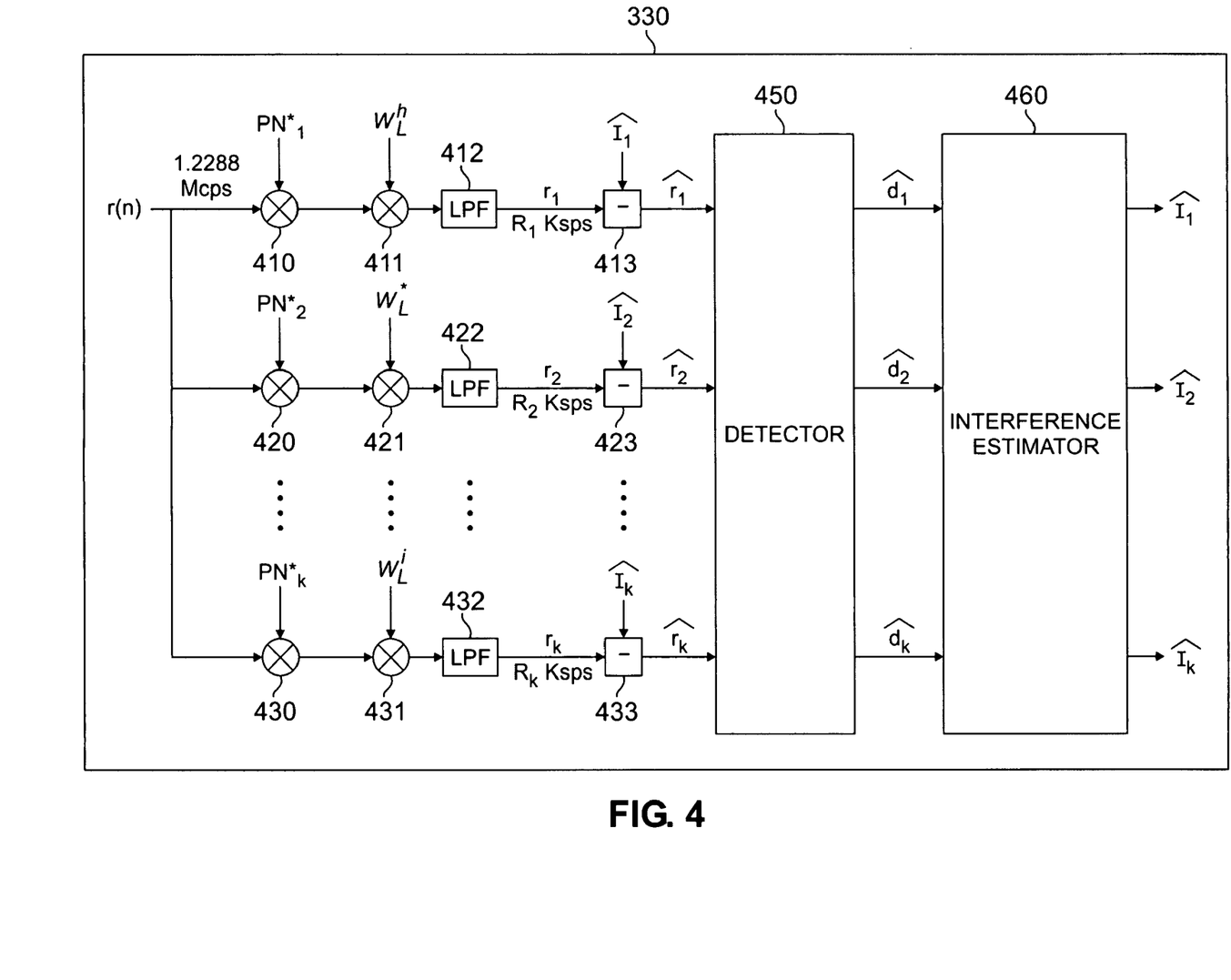
FIG. 4 illustrates in greater detail selected portions of the interference cancellation circuitry in the exemplary base station according to one embodiment of the present invention.

FIG. 4 illustrates selected portions of interference cancellation circuit 330 in exemplary base station 101 according to an exemplary embodiment of the present invention. Interference cancellation circuit 330 in FIG. 4 is intended to be a generic representation that cancels interference of the supplemental data channel signal in the sequence of complex digital samples, r(n). Interference cancellation circuit 330 comprises a plurality of complex PN demodulators in a first stage, including exemplary complex PN demodulators 410, 420 and 430, a plurality of Walsh code demodulators in a second stage, including exemplary Walsh code demodulators 411, 421, and 431, and a plurality of low-pass filters, including exemplary low-pass filters 412, 422, and 432. Interference cancellation circuit 330 further comprises a plurality of subtractors, including exemplary subtractors 413, 423 and 433, detector 450, and interference estimator 460.

The interference cancellation operations performed by interference cancellation circuit 330 are based on several assumptions. It is assumed that interference cancellation circuit 330 is only concerned with canceling high data rate and high power reverse supplemental channel signals. Thus, all interfering mobile stations use the same Walsh codes. For simplicity, it is assumed that self-interference due to multipath may be ignored, since it is not the dominant interference source. However, alternate embodiments of the present invention may be easily adapted to include multi-path interference. Lastly, it is assumed that all the interferers are in the same BTS sector.

The sequence of complex digital samples, r(n), represents a complex chip stream arriving at 1.2288 Mcps. The r(n) input signal is applied to K complex PN demodulators, including exemplary complex PN demodulators 410, 420 and 430. The value of K is variable, depending on how many mobile stations are communicating with base station 101. Due to multipath effects, several copies of the reverse channel signal from each mobile station may be received at base station 101. If several strong multipath signals are received from each mobile station, several possible offsets of the PN code may be used to detect each multipath component.

For example, if three significant multipath signals are received from mobile station 111, these three signals may be detected by three PN demodulators using three different offsets of the PN long code mask used by mobile station 111. Thus, interference cancellation circuit 330 assigns a PN demodulator to detect signals for each offset of the PN long code mask for each mobile station. However, for the purpose of simplicity in explaining the operation of the present invention, it shall be assumed hereafter that base station 101 receives only one dominant signal from each mobile station. Therefore, interference cancellation circuit 330 assigns only one PN demodulator to detect signals for a single offset of the PN long code mask for each mobile station. Thus, if K mobile stations are communicating with base station 101, K PN demodulators are assigned by interference cancellation circuit 330.

Each PN demodulator multiples the r(n) signal by a corresponding complex pseudo-random noise (PN) sequence to recover a Walsh code chip sequence for each mobile station. Each chip stream output of an input stage PN demodulator is then applied to the input of a second stage Walsh code demodulator. The second stage Walsh code demodulator uses the Walsh code corresponding to the mobile station whose PN code was used in the first stage PN demodulator.

For example, a Walsh code demodulator detecting signals from mobile station 111 multiplies the chip stream output from the PN demodulator by a length L Walsh code to generate the raw user signal, r, corresponding to the data stream in mobile station 111 that was applied to the input of multiplier 201 in FIG. 2. Each raw user signal, $r_i$, has a data rate of $R_i$ Ksps (kilosymbols per second). Thus, the outputs of the second stage Walsh demodulators have data rates $R_1$, $R_2, \ldots, R_K$. The raw user signal, r, output from each Walsh code demodulator is then applied to a low-pass filter (LPF) to produce a filtered raw user signal.

Each output of a low-pass filter is applied to one of the subtractors, such as exemplary subtractors 413, 423, and 433. The other input of each subtractor is an estimated interference signal, $\hat{I}$. Each subtractor subtracts the estimated interference value from the raw user signal received from a low-pass filter to produce an estimated user signal, $\hat{r}_i$. For example, subtractor 413 receives the raw user signal $r_1$ and subtracts the estimated interference signal $\hat{I}_I$ to produce the estimated user signal, $\hat{r}_I$.

Detector 450 receives all of the estimated user signals, $\hat{r}_I$ through $\hat{r}_K$, associated with $PN_1$ through $PN_K$ and the set of W Walsh codes. Detector 450 produces detected user outputs for each estimated user signal for each path through the PN demodulators and Walsh code demodulators. Thus, for example, detector 450 produces the detected user signals, $\hat{d}_I$ through $\hat{d}_K$.

According to an advantageous embodiment of the present invention, detector 450 is a threshold detector that compares the outputs of the subtractors to predetermined threshold values to determine whether or not a signal is present for each Walsh code channel. If an estimated user signal does not exceed the predetermined threshold, the detector outputs a zero value for the detected user signal in the corresponding Walsh code channel. For example, if the value of the estimated user signal, $\hat{r}_I$, at the output of subtractor 413 does not exceed the predetermined threshold, detector 450 outputs a zero for the detected user signal, $\hat{d}_I$.

Interference estimator 460 receives all of the detected interference signals from detector 450 and produces the estimated interference signals, $\hat{I}_i$, used by the subtractors. According to an advantageous embodiment of the present invention, interference estimator 460 compares the interference in each detected user signal to a predetermined threshold value to determine whether or not a strong interference signal is present in each detected user signal. If the interference in a detected user signal does not exceed the predetermined threshold, interference estimator 460 outputs a zero value for the corresponding estimated interference signals, $\hat{I}_i$.

For example, if the interference in the detected user signal, $\hat{d}_I$ is weak and does not exceed the predetermined threshold, interference estimator 460 outputs a zero value for the estimated interference signal, $\hat{I}_I$. According to an advantageous embodiment of the present invention, the strongest interference signals will correspond to the Walsh codes that are used by mobile stations that are transmitting data on the Supplemental Data channel. Thus, the estimated interference signal that is applied to each subtractor will largely comprise interference caused by mobile stations engaged in data call sessions, rather than voice users.

Interference cancellation circuit 330 executes a unique algorithm for canceling interference and improving signal quality in a single antenna base station. Although the algorithm of the present invention may be used for voice channels and data channels, voice channels may gain the most from the present invention, since voice channels are typically at a very low power compared to the data channels. Successive interference cancellation techniques in the prior art first determine the strongest channel, cancel the strongest channel, and then repeat this process for all channels. However, in 1xEV-DV and 1xEV-DO, there is only one dominant reverse channel, namely the Supplemental channel (SCH), which is known to be the strongest channel. The present invention takes advantage of this knowledge and cancels the known interference from mobile stations that are transmitting packet data.

The algorithm of the present invention may be explained as follows. Assuming there are K interfering mobile stations, then the received signal at the BTS of base station 101 may be represented by the equation:

$$r(n) = \sum_{k=1}^{K} a_k d_k W(n-k) C_k(n-k) + u(n) \quad [\text{Eqn. 1}]$$

In Equation 1, $d_k$ is the data, $W(n)$ is the length N Walsh code, $C_k(n)$ is the corresponding complex PN code of the k'th mobile station, and $a_k$ is the complex channel corresponding to the k'th mobile station. Base station 101 then demodulates and detects user data from the l'th mobile station as:

$$\hat{d}_l = \sum_{n=1}^{N} \hat{a}_l^* W(n-1) C_l(n-l) r(n). \quad [\text{Eqn. 2}]$$

Substituting $r(n)$ from Equation 1 gives:

$$\hat{d}_l = N|a_l|^2 d_l + \quad [\text{Eqn. 3}]$$
$$\sum_{n=1}^{N} \sum_{k \neq l}^{K} a_k a_l^* d_k W(n-l) C_l(n-l) W(n-k) C(n-k) + u'.$$

The term $u(n)$ represents the thermal noise generated in the BTS receiver amplifier in base station 101.

The interference cancellation scheme of the present invention takes advantage of the fact that, since base station 101 is already demodulating all of the interferer signals, base station 101 may as well use the interferer information for the purpose of interference cancellation. The interference term in Equation 3 is represented by:

$$I_l = \sum_{n=1}^{N} \sum_{k \neq l}^{K} a_k a_l^* d_k W(n-l) C_l(n-l) W(n-k) C(n-k). \quad [\text{Eqn. 4}]$$

It is noted note that the BTS in base station 101 already knows exactly all the components of $I_l$. Therefore, all that remains is simply to calculate, and then cancel, $I_l$. The present invention proposes the following algorithm to perform interference cancellation.

Step 1—Cancellation circuit 330 detects $\hat{d}_l$, the user data for the l'th mobile station, using the conventional technique as described above in Equation 2.

Step 2—Next, interference estimator 460 in cancellation circuit 330 estimates the interference to the l'th mobile station as:

$$\hat{I}_l = \sum_{n=1}^{N} \sum_{k \neq l}^{K} \hat{a}_k^* \hat{d}_k W(n-l) C_l(n-l) W(n-k) C(n-k). \quad [\text{Eqn. 5}]$$

Step 3—Interference cancellation circuit 330 re-estimates $\hat{d}_l$ after interference cancellation by feeding $\hat{I}_l$ back to the corresponding subtractor. Thus, the updated estimate for $\hat{d}_l$ is given by:

$$\hat{d}_l = \hat{d}_l - \hat{I}_l. \quad [\text{Eqn. 6}]$$

Base station 101 may then use the updated values of $\hat{d}_l$ as the final user data streams from the mobile stations. Those skilled in the art will appreciate that schematic in FIG. 4 is merely a figurative representation of the algorithm of the present invention. It is noted that much of the functionality of interference cancellation circuit 330 may be implemented using a digital signal processor (DSP) executing instructions, rather than by discrete components. It also is noted that this is an ideal interference cancellation scheme. Many simplifications may be considered in any practical implementation.

Furthermore, for the purpose of simplicity, it was assumed above that base station 101 receives only one dominant signal from each mobile station. In a practical environment, multipath signals may cause more than one strong signal to be received from each mobile station. It was noted above that interference cancellation circuit 330 may detect and cancel several multipath signals from each mobile station by assigning several PN demodulators using different offsets to detect the PN long code mask for the same mobile station. Thus, the number of detected signals at the output of detector 450 may exceed the number of mobile stations. However, interference estimator 460 compensates for this when determining the interference estimate signals.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network capable of communicating with K mobile stations in a cell site, a base station in the cell site capable of canceling interference caused by a dominant interferer signal from a plurality of mobile stations, said base station comprising:
   a radio frequency (RF) down-converter configured to receive an RF signal and outputting a down-converted signal, r(n);
   K complex pseudo-random noise (PN) demodulators configured to multiply said down-converted r(n) signal by at least one PN code sequence associated with each of said K mobile stations, said K PN demodulators producing K chip streams;
   K Walsh code demodulators, each of said K Walsh code demodulators configured to multiply one of said K chip streams by a Walsh code corresponding to the PN code sequence associated with one of said K mobile stations, said K Walsh code demodulators producing K raw user signals;
   K subtractors, each of said K subtractors configured to subtract a first estimated interference signal associated with said dominant interferer signal from one of said K raw user signals, said K subtractors producing K estimated user signals, wherein the first estimated interference signal is determined based on known interference components of only said K mobile stations located in the cell site that are transmitting packet data over a reverse data channel of the base station; and
   a detector configured to receive said K estimated user signals and detect a user signal for each of the K estimated user signals, the detector outputs the detected user signal unless the respective estimated user signal is below a first threshold value, wherein the base station selectively cancels interference caused by at least one of said K mobile stations located in the cell site that is transmitting packet data over the reverse data channel of the base station.

2. The base station as set forth in claim 1, wherein said detector determines which of said K estimated user signals exceeds said first threshold value.

3. The base station as set forth in claim 2, wherein said detector outputs a detected user signal equal to zero for each of said K mobile stations for which no estimated user signal exceeds said first threshold value.

4. The base station as set forth in claim 3, further comprising an interference estimator configured to receive said K detected user signals from said detector and compare an interference signal in each of said K detected user signals to a second threshold value.

5. The base station as set forth in claim 4, wherein said interference estimator outputs an estimated interference signal for each of said K detected user signals, said interference estimator thereby producing K estimated interference signals.

6. The base station as set forth in claim 5, wherein said interference estimator outputs a zero value for each estimated interference signal that does not exceed said second threshold value.

7. The base station as set forth in claim 6, wherein said interference estimator determines which of said K estimated interference signals comprises said first estimated interference signal associated with said dominant interferer signal.

8. The base station as set forth in claim 7, wherein said interference estimator, in response to said determinations, applies said first estimated interference signal associated with said dominant interferer signal as an input to each of said K subtractors.

9. A wireless network comprising a plurality of base stations, each of said base stations capable of communicating with K mobile stations located in a cell site of each said base station and capable of canceling interference caused by a dominant interferer signal from a plurality of mobile stations, said each base station comprising:
   a radio frequency (RF) down-converter configured to receive an RF signal and outputting a down-converted signal, $r(n)$;
   K complex pseudo-random noise (PN) demodulators configured to multiply said down-converted $r(n)$ signal by at least one PN code sequence associated with each of said K mobile stations, said K PN demodulators producing K chip streams;
   K Walsh code demodulators, each of said K Walsh code demodulators configured to multiply one of said K chip streams by a Walsh code corresponding to the PN code sequence associated with one of said K mobile stations, said K Walsh code demodulators producing K raw user signals;
   K subtractors, each of said K subtractors configured to subtract a first estimated interference signal associated with said dominant interferer signal from one of said K raw user signals, said K subtractors producing K estimated user signals, wherein the first estimated interference signal is determined based on known interference components of only said K mobile stations located in the cell site that are transmitting packet data over a reverse data channel of the base station; and
   a detector configured to receive said K estimated user signals and detect a user signal for each of said K mobile stations, wherein, for each of the K estimated user signals, the detector outputs the detected user signal unless the respective estimated user signal is below a first threshold value, wherein the base station selectively cancels interference caused by at least one of said K mobile stations transmitting packet data over reverse data channel of the base station.

10. The wireless network as set forth in claim 9, wherein said detector determines which of said K estimated user signals exceeds a first threshold value.

11. The wireless network as set forth in claim 10, wherein said detector outputs a detected user signal equal to zero for each of said K mobile stations for which no estimated user signal exceeds said first threshold value.

12. The wireless network as set forth in claim 11, wherein said each base station further comprises an interference estimator configured to receive said K detected user signals from said detector and compare an interference signal in each of said K detected user signals to a second threshold value.

13. The wireless network as set forth in claim 12, wherein said interference estimator outputs an estimated interference signal for each of said K detected user signals, said interference estimator thereby producing K estimated interference signals.

14. The wireless network as set forth in claim 13, wherein said interference estimator outputs a zero value for each estimated interference signal that does not exceed said second threshold value.

15. The wireless network as set forth in claim 14, wherein said interference estimator determines which of said K estimated interference signals comprises said first estimated interference signal associated with said dominant interferer signal.

16. The wireless network as set forth in claim 15, wherein said interference estimator, in response to said determinations, applies said first estimated interference signal associated with said dominant interferer signal as an input to each of said K subtractors.

17. For use in a wireless network base station in a cell site capable of communicating with K mobile stations located in the cell site, a method of canceling interference caused by a dominant interferer signal from a plurality of mobile stations, the method comprising:
   receiving and down-converting an RF signal to produce a down-converted signal, $r(n)$;
   multiplying the down-converted $r(n)$ signal by at least one complex PN code sequence associated with each of the K mobile stations to produce K chip streams;
   multiplying each one of the K chip streams by a Walsh code corresponding to the PN code sequence associated with one of the K mobile stations to produce K raw user signals;
   subtracting a first estimated interference signal associated with the dominant interferer signal from each one of the K raw user signals to produce K estimated user signals, wherein the first estimated interference signal is determined based on known interference components of only said K mobile stations located in the cell site that are transmitting packet data over a reverse data channel of the base station; and
   detecting a user signal in each of the K estimated user signals to produce K detected user signals unless the respective estimated user signal is below a first threshold value, wherein the base station selectively cancels interference caused by at least one of said K mobile stations located in the cell site that is transmitting packet data over the reverse data channel of the base station.

18. The method as set forth in claim 17, further comprising: comparing an interference signal in each of the K detected user signals to a second threshold value.

19. The method as set forth in claim 18, further comprising generating an estimated interference signal for each of the K detected user signals to produce K estimated interference signals, wherein a zero value is set for each estimated interference signal when the interference signal in the respective detected user signal does not exceed the second threshold value.

20. The method as set forth in claim 19, further comprising determining which of the K estimated interference signals comprises the first estimated interference signal associated with the dominant interferer signal.

* * * * *